Figure 1:
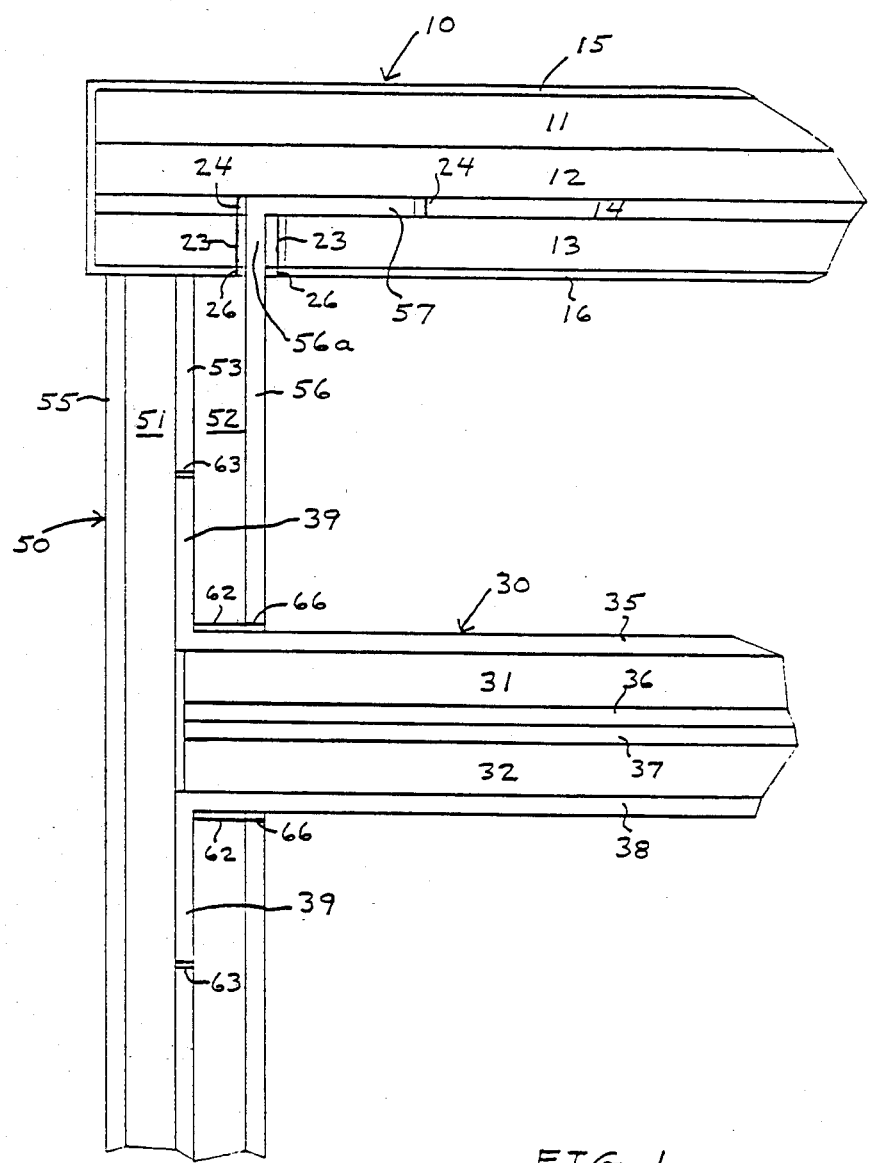

United States Patent [19]

Sheffer

[11] Patent Number: 4,630,549

[45] Date of Patent: Dec. 23, 1986

[54] STRUCTURAL LOCKING DEVICE

[75] Inventor: Phil B. Sheffer, New Oxford, Pa.

[73] Assignee: Merchandising Innovations, Inc., Hanover, Pa.

[21] Appl. No.: 813,660

[22] Filed: Dec. 26, 1985

[51] Int. Cl.⁴ .................................................. A47B 3/00
[52] U.S. Cl. .................................. 108/111; 108/159; 312/259
[58] Field of Search ................... 108/159, 153, 111; 312/262, 259, 195; 5/DIG. 1; 297/442

[56] References Cited

U.S. PATENT DOCUMENTS

| 2,615,771 | 10/1952 | Curtis | 108/159 |
| 3,212,464 | 10/1965 | Steuer | 108/159 |
| 4,519,318 | 5/1985 | Weldon-Ming | 108/159 |
| 4,558,649 | 12/1985 | Maier | 108/159 |

FOREIGN PATENT DOCUMENTS 1169686  11/1969  United Kingdom ................ 108/159

Primary Examiner—James T. McCall
Attorney, Agent, or Firm—Daniel J. O'Connor

[57] ABSTRACT

A novel structural locking apparatus and method which utilizes corrugated fiberboard components entirely to join structural elements into a finished product of high durability.

The locking apparatus is specifically designed for and applied to bookshelving units but may readily be applied to larger or smaller products wherein it is necessary to join one wall surface to another.

A unique design allows all components to be factory pre-cut so that the apparatus components may be readily assembled by personnel unskilled in the art of furniture assembly.

The design allows the bookshelf kit components to be shipped flat for reduced transportation costs.

9 Claims, 1 Drawing Figure

STRUCTURAL LOCKING DEVICE

Papers relating to the present invention were previously filed under the Disclosure Document program of the U.S. Patent Office.

BACKGROUND AND OBJECTS OF THE INVENTION

The present invention relates to a novel structural locking device and system which is intended for use in bookshelves made entirely of corrugated fiberboard. It will be appreciated, however, that the principles disclosed herein will have widespread use in other mechanical structural locking areas.

It is well-known in the art that fully assembled wooden or metal bookshelves are quite expensive. The expensive materials utilized help to raise the cost, as does labor to assemble the devices and weight and volume requirements of such assembled units render the shipping and warehousing costs extremely high. Thus, the unit price to the ultimate consumer is quite high and, consequently, unit sales are depressed.

It is known to ship such items as bookshelves, etc. in an unassembled condition. However, such units are typically of inferior quality and require numerous fasteners and complex assembly procedures by the purchaser. The use of numerous fasteners is not only a problem for the consumer but also for the manufacturer since detailed care and labor expense must be used to ensure that the proper number and types of fasteners are shipped with each unit.

It would therefore be desirable in the art to provide bookshelves, or other related furniture or structural items, which may be shipped in unassembled form but which require no separate fasteners for assembly and therefore no complex assembly procedures.

It would further be desirable to provide furniture items in which the component parts for assembly may be shipped in a flat position to reduce shipping and warehousing volume requirements.

It would also be advantageous to fabricate such furniture units of a light-weight material to further reduce shipping costs.

Further objects and advantages of the present invention will become apparent as the following description proceeds, and the features of novelty characterizing the invention will be pointed out with particularity in the claims annexed to and forming a part of this specification.

PRIOR ART PATENTS

The use of knockdown bookshelf or shelving units is known in the prior art as illustrated by the following: U.S. Pat. No. 2,993,603 issued to Fohn; U.S. Pat. No. 4,098,197 issued to Jorgensen; U.S. Pat. No. 3,100,460 issued to McElroy; and U.S. Pat. No. 4,151,803 issued to Ferrera.

All of the above patents illustrate the relatively complex assembly techniques required in prior art bookshelving systems. The patents further illustrate the high manufacturing costs required to produce such systems.

The multiple and diverse fasteners shown in the prior art bookshelving systems are a source of high manufacturing costs and unwanted complexity for the consumer who must assemble such units.

Further, the materials and sharp edges required in prior art systems are a serious potential cause of products liability claims in an age of increasing personal injury claims against manufacturers.

Finally, the prior art systems, even though complex in an engineering sense, do not result in end products which are sufficiently stable as compared to the present invention.

BRIEF SUMMARY OF THE INVENTION

The invention material comprises corrugated fiberboard layers which are factory glued into highly durable configurations.

The layers are precut and glued in a design which allows a simple slide insertion of component parts together, without the use of fasteners or glue by the consumer, and yet results in a furniture unit with an extremely high structural integrity level and a very pleasing overall appearance.

The unique design of the corrugated fiberboard layers results in furniture components which have self-contained fastener structures contained therein.

The design also yields furniture parts which may be shipped in an entirely flat position to reduce shipping costs.

BRIEF DESCRIPTION OF THE DRAWING FIGURE

The drawing FIG. 1 shows a corner portion of a bookshelf illustrating the means of connecting a top shelf to a vertical side wall and of connecting lower shelves to said vertical side wall.

FULL DESCRIPTION OF THE INVENTION

Reference is now made to the drawing FIGURE in detail in which an upper corner portion of a bookshelf is shown.

Upper shelf 10 has three layers 11, 12 and 13 of double wall corrugated fiberboard therein with a layer of single wall corrugated fiberboard 14 between layers 12 and 13. A continuous outer wrap layer 15, 16 is also shown. It is to be understood that the layers 11 thru 16 are factory glued together into a single preformed top shelf.

Layer 14 has a channel, indicated by lines 24, cut therein. Layer 13 has a channel 23 cut therein and layer 16 has a channel 26 cut therein.

As shown, the channels 23, 24 and 26 allow the slidable insertion of flap 57 which extends from the wrap layer 56 of the vertical side wall 50.

Vertical side wall 50 comprises two layers of double wall corrugated fiberboard 51 and 52 with a single wall corrugated fiberboard 53 sandwiched therebetween. Outer wrap layers 55, 56 consists of one continuous piece of corrugated fiberboard. Again, all layers are factory glued into the position shown.

Middle layer 53 has precut therein a channel indicated by lines 63. Layer 52 has a channel 62 precut therein as shown and layer 56 has a channel 66 precut therein.

It will thus be appreciated that the left portion of shelf 30 including bendable flaps 39 can be easily slid into the channels 63, 62 and 66 to form the bookshelf without the need for fasteners of any kind.

Horizontal lower shelf 30 comprises two internal layers of double corrugated fiberboard 31 and 32 with wrapping layers 35, 36, 37 and 38 consisting of a continuous sheet of single wall corrugated fiberboard. The aforementioned flaps 39 are prescored to be bendable and are extensions of wrap layers 35 and 38 as shown.

The detailed construction of the lower horizontal shelf 30 will be more fully described in a related patent application.

In comparing the channels in the upper connection to the lower connection, it can be seen that channels 23 and 26 need only be wide enough to accommodate the width of upper portion 56a of the wrapping layer 56. Channels 62 and 66, on the other hand, must be wide enough to accommodate the entire width of shelf 30.

It will thus be appreciated that multiple channel means like those shown at 63, 62 and 66 would be formed at appropriate locations along vertical side wall 50 so as to enable multiple shelves 30 to be fitted therein.

It is noted that the channels above referred to do not extend entirely through their respective walls but only an amount sufficient to allow the appropriate shelf or side wall to be slid in according to its dimensions.

In practice, it is contemplated that the outer wrapping layers would be factory coated with a decorative finish.

In the building of test models, the inventor has found that the described interlocking system, which makes use of readily available corrugated fiberboard materials, yields a completed structure which is extremely sturdy and pleasing in appearance.

The system design, as can be appreciated, allows component parts to be shipped in a flat, disassembled position yet be easily and quickly assembled by the purchaser.

It will of course be appreciated that the corrugated fiberboard interlocking system of the present invention could be effectively utilized in many other furniture and structural applications and it is intended to cover such other uses.

Although corrugated fiberboard is the highly preferred material of use in the present invention, it is recognized that other materials may possibly be used to carry out the locking principles described herein. It is intended that such other materials be considered as within the true spirit and scope of the invention.

While there has been illustrated and described what is at present considered to be a preferred embodiment of the present invention. it will be appreciated that numerous changes and modifications are likely to occur to those skilled in the art, and it is intended in the appended claims to cover all those changes and modifications which fall within the true spirit and scope of the present invention.

I claim:

1. A factory preformed upper shelving unit means (10) comprising:
    plural layer means (11, 12, 13) comprised of a corrugated fiberboard material,
    an outer wrapping layer means (15, 16) formed around said plural layer means (11, 12, 13),
    a flap recieving layer means (14) being formed between two of said plural layer means (11, 12, 13),
    said flap receiving layer means (14) having a widened channel means (24) factory preformed therein,
    at least one of said plural layer means (13) having narrow channel means (23) factory preformed therein and positioned so as to open into said widened channel means (24),
    a portion of said outer wrapping layer means (16) having narrow channel means (26) formed therein and positioned so as to open into the narrow channel means (23) of said at least one plural layer means (13),
    means whereby a flap (57) may be slid into said widened channel means (24),
    and means whereby an extension (56a) of said flap (57) is received by each of said narrow channel means (23, 26).

2. The apparatus of claim 1 wherein said plural layer means comprises a first upper layer (11), a second middle layer (12) and a third lower layer (13), each of said layers (11, 12, 13) comprising double wall corrugated fiberboard.

3. The apparatus of claim 2 wherein said flap receiving layer means (14) is comprised of single wall corrugated fiberboard and is factory pre-glued in position between said second middle layer (12) and said third lower layer (13).

4. The apparatus of claim 1 wherein said outer wrapping layer means (15, 16) comprises a corrugated fiberboard material.

5. A factory preformed wall means (50) comprising:
    plural layer means (51, 52) comprised of a corrugated fiberboard material,
    an outer wrapping layer means (55, 56) formed around said plural layer means (51, 52),
    a flap receiving layer means (53) formed between said plural layer means (51, 52),
    said flap receiving layer means having a widened channel means (63) factory preformed therein,
    at least one of said plural layer means (52) having narrow channel means (62) factory preformed therein and positioned so as to open into said widened channel means (63),
    a portion of said outer wrapping layer means (56) having narrow channel means (66) formed therein and positioned so as to open into the narrow channel means (62) of said at least one plural layer means (52),
    a portion of said outer wrapping layer means (56) having an extended upper portion (56a) formed thereon with a bendable flap means (57) attached to said upper portion,
    means whereby said flap (57) may be inserted by sliding into an adjoining wall means (10),
    means whereby said widened channel (63) in cooperation with said narrow channel means (62, 66) may receive flap element means (39) from an adjoining wall means (30).

6. The apparatus of claim 5 wherein said plural layer means comprises a first layer (51) and a second layer (52) each made of double wall corrugated fiberboard material.

7. The apparatus of claim 6 wherein said flap receiving layer means (53) is comprised of single wall corrugated fiberboard and is factory pre-glued in position between said first layer (51) and said second layer (52).

8. The apparatus of claim 5 wherein said outer wrapping layer means (55, 56) comprises a corrugated fiberboard material.

9. A combination bookshelf or panel assembly kit comprising:
    plural layer means (11, 12, 13) comprised of a corrugated fiberboard material,
    an outer wrapping layer means (15, 16) formed around said plural layer means (11, 12, 13),
    a flap receiving layer means (14) being formed between two of said plural layer means (11, 12, 13),
    said flap receiving layer means (14) having a widened channel means (24) factory preformed therein, at least one of said plural layer means (13) having narrow channel means (23) factory preformed therein and positioned so as to open into said widened channel means (24), a portion of said outer wrapping layer means (16) having narrow channel means (26) formed therein and positioned so as to open into the narrow channel means (23) of said at least one plural layer means (13), means whereby a flap (57) may be slid into said widened channel means (24), and means whereby an extension (56a) of said flap (57) is received by each of said narrow channel means (23, 26), plural layer means (51, 52) comprised of a corrugated fiberboard material, an outer wrapping layer means (55, 56) formed around said plural layer means (51, 52), a flap receiving layer means (53) formed between said plural layer means (51, 52), said flap receiving layer means having a widened channel means (63) factory preformed therein, at least one of said plural layer means (52) having narrow channel means (62) factory preformed therein and positioned so as to open into said widened channel means (63), a portion of said outer wrapping layer means (56) having narrow channel means (66) formed therein and positioned so as to open into the narrow channel means (62) of said at least one plural layer means (52), a portion of said outer wrapping layer means (56) having an extended upper portion (56a) formed thereon with a bendable flap means (57) attached to said upper portion, means whereby said flap (57) may be inserted by sliding into an adjoining wall means (10), means whereby said widened channel (63) in cooperation with said narrow channel means (62, 66) may receive flap element means (39) from an adjoining wall means (30).

* * * * *